(12) United States Patent
Akanuma et al.

(10) Patent No.: US 9,575,240 B2
(45) Date of Patent: Feb. 21, 2017

(54) DISPLAY DEVICE

(75) Inventors: Nobuhiko Akanuma, Osaka (JP); Hiromi Enomoto, Osaka (JP); Yuhsuke Nii, Osaka (JP); Shinji Tomokawa, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 289 days.

(21) Appl. No.: 14/237,681

(22) PCT Filed: Sep. 11, 2012

(86) PCT No.: PCT/JP2012/005746
§ 371 (c)(1),
(2), (4) Date: Feb. 7, 2014

(87) PCT Pub. No.: WO2013/038654
PCT Pub. Date: Mar. 21, 2013

(65) Prior Publication Data
US 2014/0192279 A1 Jul. 10, 2014

(30) Foreign Application Priority Data
Sep. 15, 2011 (JP) .................... 2011-202316

(51) Int. Cl.
*H04M 1/02* (2006.01)
*F21V 8/00* (2006.01)
(Continued)

(52) U.S. Cl.
CPC ......... *G02B 6/0075* (2013.01); *G02F 1/13338* (2013.01); *G06F 1/1692* (2013.01);
(Continued)

(58) Field of Classification Search
CPC ............... G02F 1/13338; G02F 2001/133331; G02F 1/133608; G02F 1/133616; G02F 1/133308; G02F 2001/13332; G02F 2001/133616; G02F 2001/133626; G02F 1/133603; H04M 1/0266; H04M 2250/22; G06F 3/0412; G06F 1/1692; G02B 6/0075
See application file for complete search history.

(56) References Cited

U.S. PATENT DOCUMENTS

2011/0037726 A1* 2/2011 Lee ................ G06F 3/0414
345/174
2011/0169759 A1* 7/2011 Wang .............. G06F 3/0416
345/173
(Continued)

FOREIGN PATENT DOCUMENTS

JP 2010-205252 A 9/2010

OTHER PUBLICATIONS

Official Communication issued in International Patent Application No. PCT/JP2012/005746, mailed on Dec. 4, 2012.

*Primary Examiner* — Jessica M Merlin
(74) *Attorney, Agent, or Firm* — Keating & Bennett, LLP

(57) ABSTRACT

A display device includes a display panel, a display area, a non-display area, a substrate member attached to the display panel with an adhesive layer interposed therebetween and including a touch panel and an operation section formed in the non-display area and used for performing an input operation on the touch panel, a step portion formed at least by a side portion of the display panel and a side portion of the adhesive layer such that a void is generated in a part between the display panel and the substrate member, and a light source unit disposed in the void such that at least a part of the light source unit is superimposed on the display panel in the step portion and configured to supply illumination light to the operation section to light the operation section.

13 Claims, 12 Drawing Sheets

(51) Int. Cl.
*G02F 1/1333* (2006.01)
*G06F 1/16* (2006.01)

(52) U.S. Cl.
CPC ............... *H04M 1/0266* (2013.01); *G02F 2001/133388* (2013.01); *G02F 2202/28* (2013.01); *H04M 2250/22* (2013.01)

(56) References Cited

U.S. PATENT DOCUMENTS

| | | | |
|---|---|---|---|
| 2011/0169860 A1 | 7/2011 | Ito | |
| 2011/0260989 A1* | 10/2011 | Tho | G02F 1/133308 345/173 |
| 2012/0276957 A1* | 11/2012 | Yang | H04M 1/0266 455/566 |
| 2012/0329526 A1* | 12/2012 | Song | G06F 1/1643 455/566 |

* cited by examiner

DISPLAY DEVICE

TECHNICAL FIELD

The present disclosure relates to display devices.

BACKGROUND ART

In recent years, there have been an increasing demand for flat display devices (flat panel displays), such as, for example, a liquid crystal display device and the like, and flat display devices have been widely used for mobile devices, such as smart phones, mobile phones, and the like.

For example, a liquid crystal display device includes a back light unit serving as a light device, and a liquid crystal display panel disposed so as to face the back light unit. In recent years, the function of display devices is improved by superimposing not only a back light unit but also, for example, a so-called touch panel, a parallax barrier panel for performing a stereoscopic image display, and the like, on a liquid crystal display panel.

As disclosed in Patent Document 1, a technique in which a display device including a display area in which main display is performed is configured such that a plurality of operation sections used for operating the display device in an area other than the display area has been known.

The plurality of operation sections in the Patent Document 1 are constituted by mechanical press buttons. In a display device including a touch panel, the plurality of operation sections may be constituted by parts of the touch panel.

CITATION LIST

Patent Document

PATENT DOCUMENT 1: Japanese Patent Publication No. 2010-205252

SUMMARY OF THE INVENTION

Technical Problem

However, in the known display device, when illumination intensity in a use environment is low, it is difficult to visibly recognize the plurality of operation sections, and the operability of the display device might be reduced.

Also, in view of reducing the overall size of the device relative to the display area, the width of a non-display area having a frame shape provided in the circumference of the display area is preferably reduced.

In view of the foregoing, the present invention has been devised and it is therefore a major object of the invention to increase the operability of a display device by lighting operation sections without increasing the width of a non-display area.

Solution to the Problem

In order to achieve the above-described object, a display device according to the present disclosure includes a display panel, a display area in which display is performed by the display panel, a non-display area formed in a circumference of the display area, a substrate member attached to the display panel with an adhesive layer interposed therebetween and including a touch panel and an operation section formed in the non-display area and used for performing an input operation on the touch panel, a step portion formed at least by a side portion of the display panel and a side portion of the adhesive layer such that a void is generated in a part between the display panel and the substrate member, and a light source unit disposed in the void such that at least a part of the light source unit is superimposed on the display panel in the step portion and configured to supply illumination light to the operation section so as to light the operation section.

In this structure, the operation section is lit by illumination light supplied from the light source unit, and thus, even when illumination intensity in a use environment is relatively low, the operation section can be visibly recognized easily. As a result, the operability of the display device can be greatly increased. Furthermore, the step portion is formed in the side portions of the display panel and the adhesive layer, so that a part of the light source unit is superimposed on the display panel in the step portion, and therefore, the light source unit can be provided in the display device without increasing the width of the non-display area.

The light source unit may include a light source, a light guide plate which light of the light source enters, a light shielding member which is provided in the circumference of the light guide plate and has a frame shape, and a flexible printed circuit board configured to control the light source provided on an opposite side of the light guide plate to a side thereof which faces the substrate member.

In this structure, light of the light source is guided by the light guide plate, and thus, a wide area can be illuminated by a relatively small number of the light sources. In addition, as compared to a case where a large number of light sources are disposed so as to emit illumination light directly to the operation section, the thickness of the light source unit can be reduced.

Furthermore, a reflection layer may be printed on the flexible printed circuit board so as to reflect light emitted from the light guide plate to the flexible printed circuit board to the light guide plate.

In this structure, light emitted from the light guide plate to the flexible printed circuit board can be reflected by the reflection layer of the flexible printed circuit board to be caused to enter the light guide plate again and be output to the operation section side, and thus, light of the light sources can be effectively used. Furthermore, the reflection layer is printed directly on the flexible printed circuit board, and thus, a reflection member used specifically for reflecting light from the light guide plate is not needed, resulting in further reduction in thickness of the light source unit. Therefore, without increasing the size of the void between the display panel and the substrate member, the light source unit can be disposed in the void.

The display panel may include a circuit member provided on the step portion, a notch portion may be formed in the light shielding member of the light source unit, and the light source unit may be disposed such that the notch portion of the light shielding member is superimposed on a part of the circuit member.

In this structure, the light source unit is disposed such that the notch portion formed in the light shielding member of the light source unit is superimposed on a part of the circuit member, and thus, the circuit member and the light source unit do not contact to each other while light leaking from the light guide plane is shielded by the light shielding member. Therefore, the light source unit can be disposed so as to be superimposed on the circuit member to thereby reduce the thickness of the non-display area without increasing the width of the non-display area.

The display panel may include a circuit member provided on the step portion, and the flexible printed circuit board may have a smaller thickness in an area thereof facing the circuit member than in other area thereof.

In this structure, the light source unit is disposed so as to be superimposed on the circuit member in the area in which the thickness of the flexible printed circuit board is relatively small, and thus, the thickness of the non-display area can be reduced without increasing the width of the non-display area.

The display device may further include a back light unit provided separately and independently from the light source unit on an opposite side of the display panel to a side thereof which faces the substrate member and serving as a light device which supplies light to the display area.

In this structure, lighting of the operation section may be controlled separately and independently from display performed by the back light unit in the display area. Therefore, lighting and turning off of the operation section can be controlled separately and independently from a display state in the display area, and the brightness in the lighting state of the operation section can be controlled.

Advantages of the Invention

According to the present disclosure, the operation section is lit by illumination light supplied from the light source unit, and thus, even when illumination intensity in a use environment is relatively low, the operation section can be visibly recognized easily. As a result, the operability of the display device can be greatly increased. Furthermore, the step portion is formed in the side portions of the display panel and the adhesive layer such that a part of the light source unit is superimposed on the display panel in the step portion, and thus, the light source unit can be provided in the display device without increasing the width of the non-display area.

DESCRIPTION OF EMBODIMENTS

Embodiments will be hereinafter described in detail with reference to the accompanying drawings. Note that the present disclosure is not limited to the following embodiments.

First Embodiment

FIGS. 1-17 illustrate a first embodiment.

Figure 1:
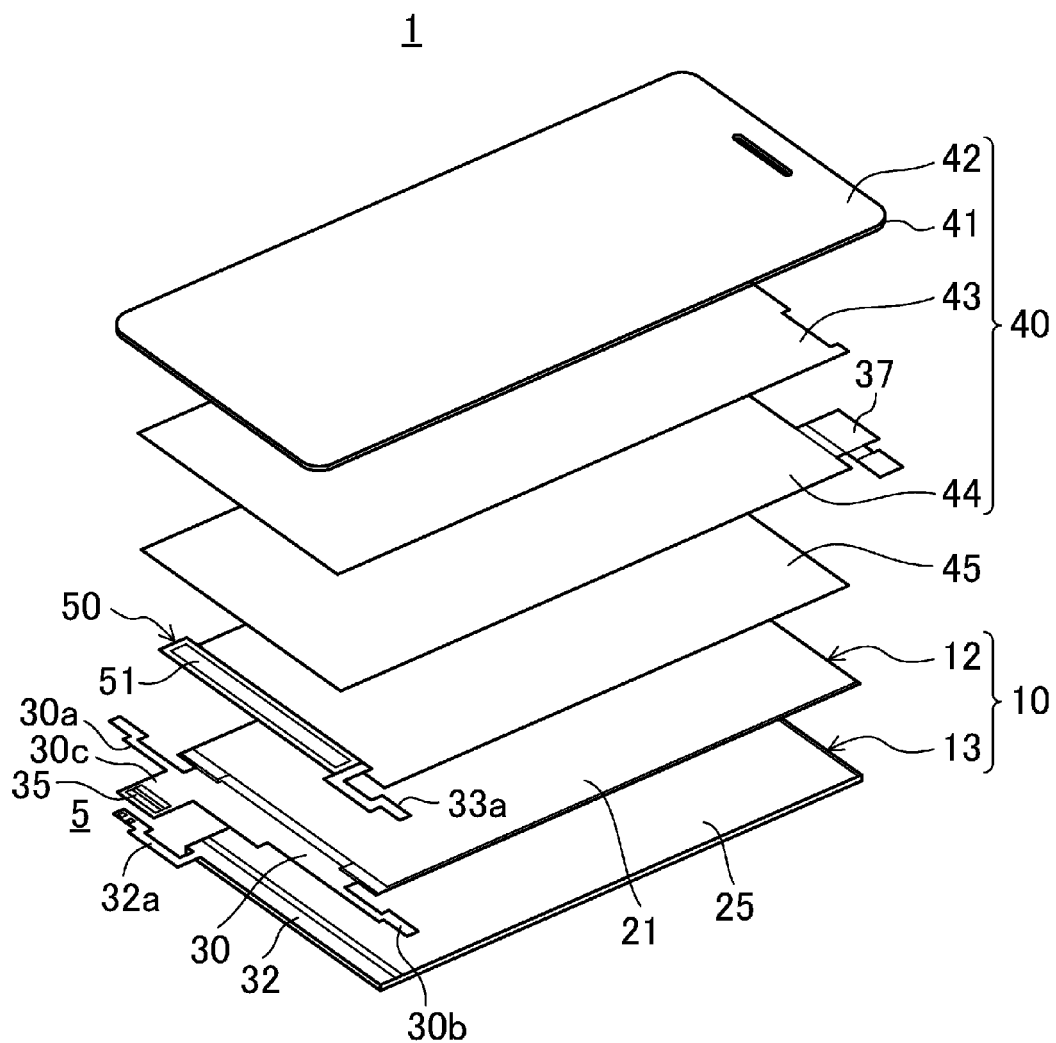
FIG. 1 is a perspective view illustrating a structure of a major part of a liquid crystal display device according to a first embodiment.
Figure 2:
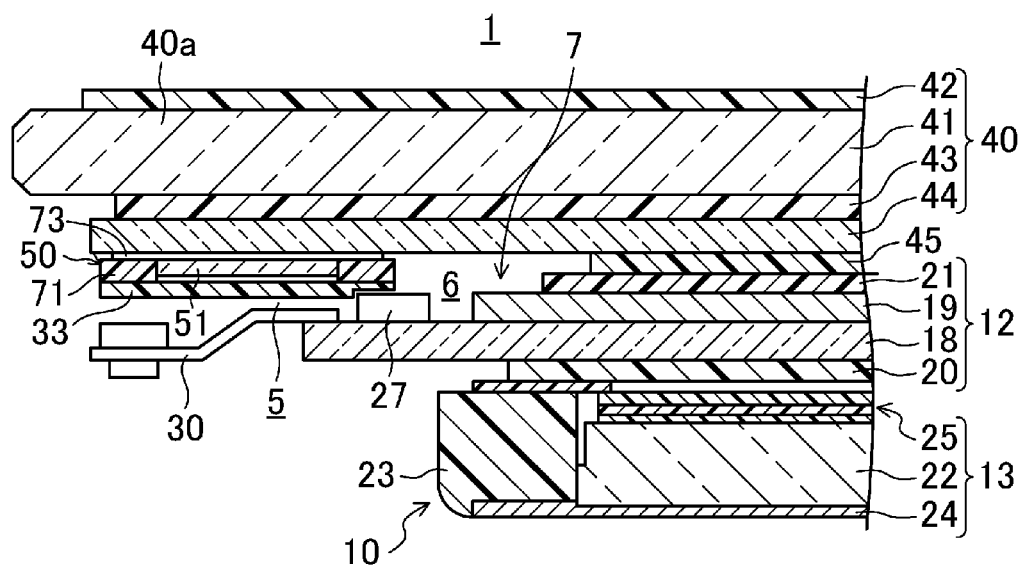
FIG. 2 is an enlarged cross-sectional view illustrating a side portion of the liquid crystal display device.
Figure 3:
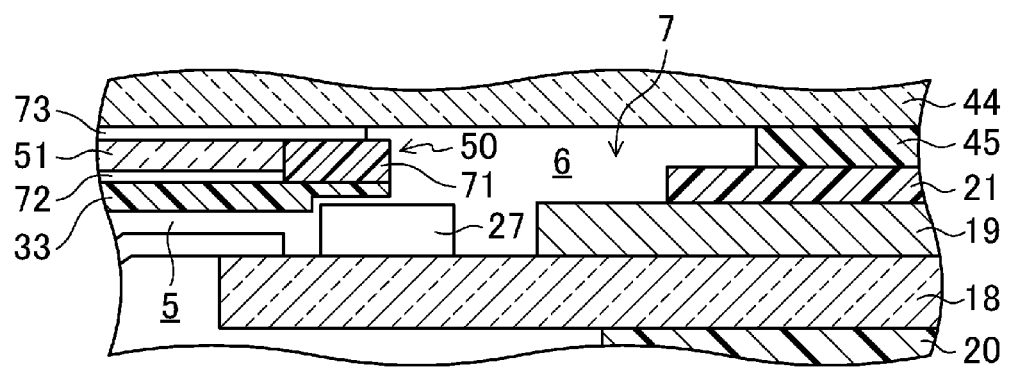
FIG. 3 is an enlarged cross-sectional view illustrating a part of FIG. 2.
Figure 4:
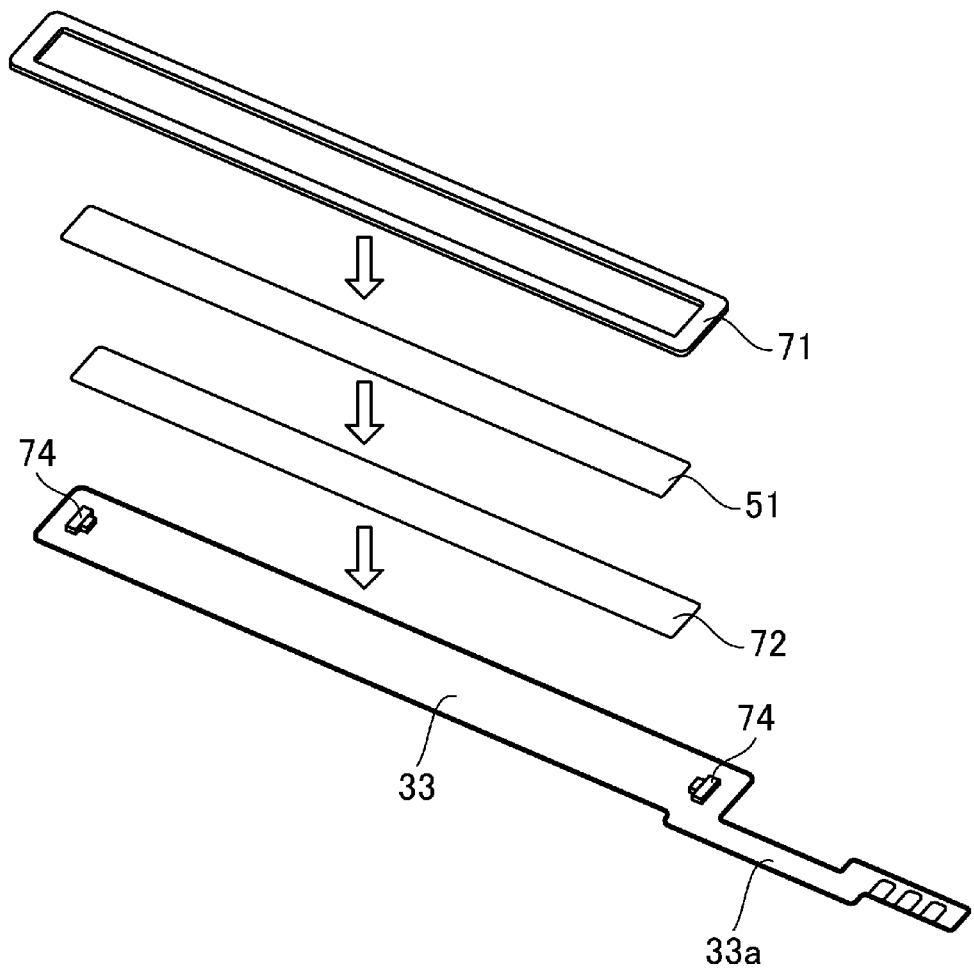
FIG. 4 is a perspective view illustrating a structure of a light source unit according to the first embodiment.
Figure 5:
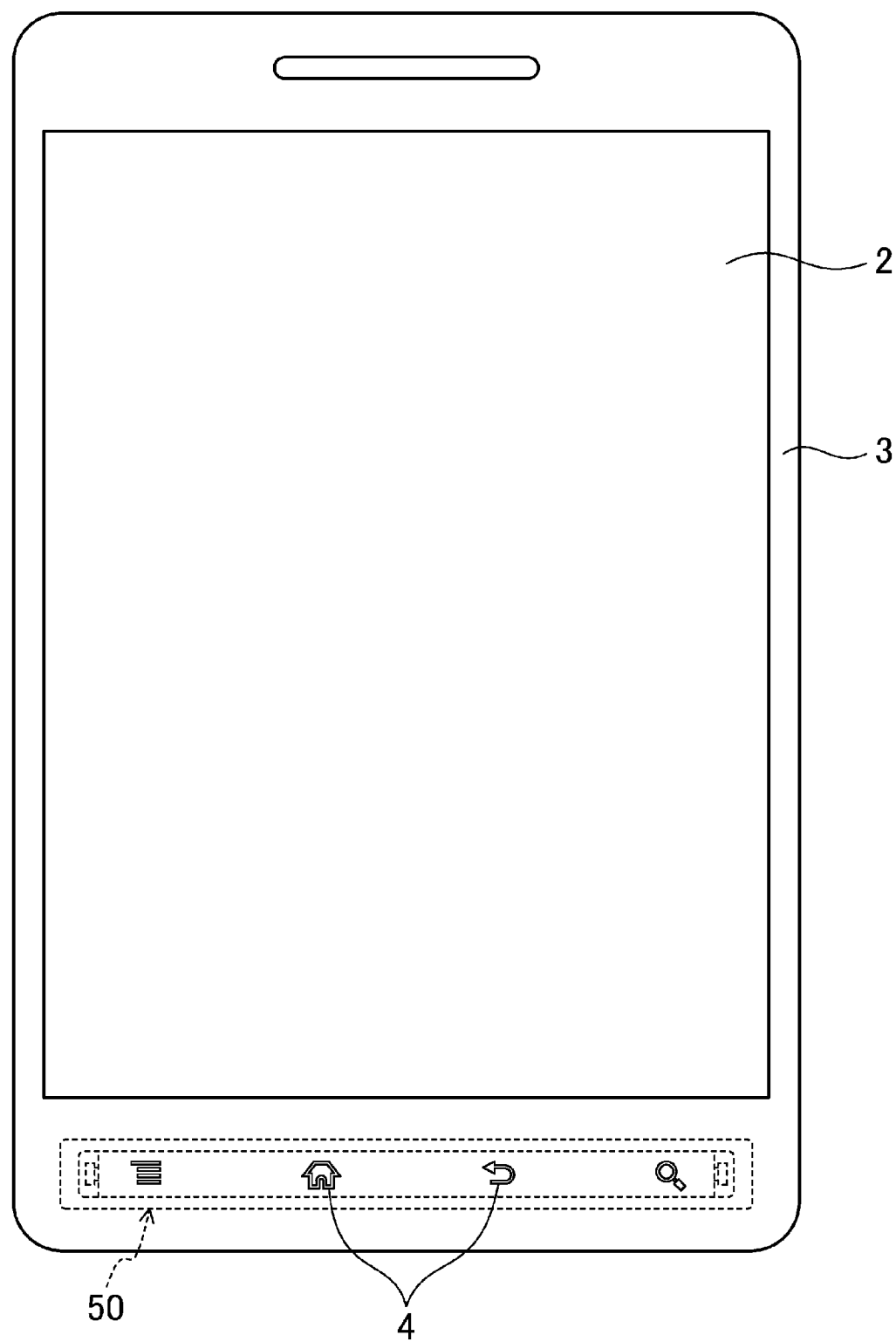
FIG. 5 is a plan view illustrating an external appearance of a liquid crystal display device.

FIG. 1 is a perspective view illustrating a structure of a major part of a liquid crystal display device 1 according to a first embodiment. FIG. 2 is an enlarged cross-sectional view illustrating a side portion of the liquid crystal display device 1. FIG. 3 is an enlarged cross-sectional view illustrating a part of FIG. 2. FIG. 4 is a perspective view illustrating a structure of a light source unit 50 according to the first embodiment. FIG. 5 is a plan view illustrating an external appearance of the liquid crystal display device 1.

Figure 15:
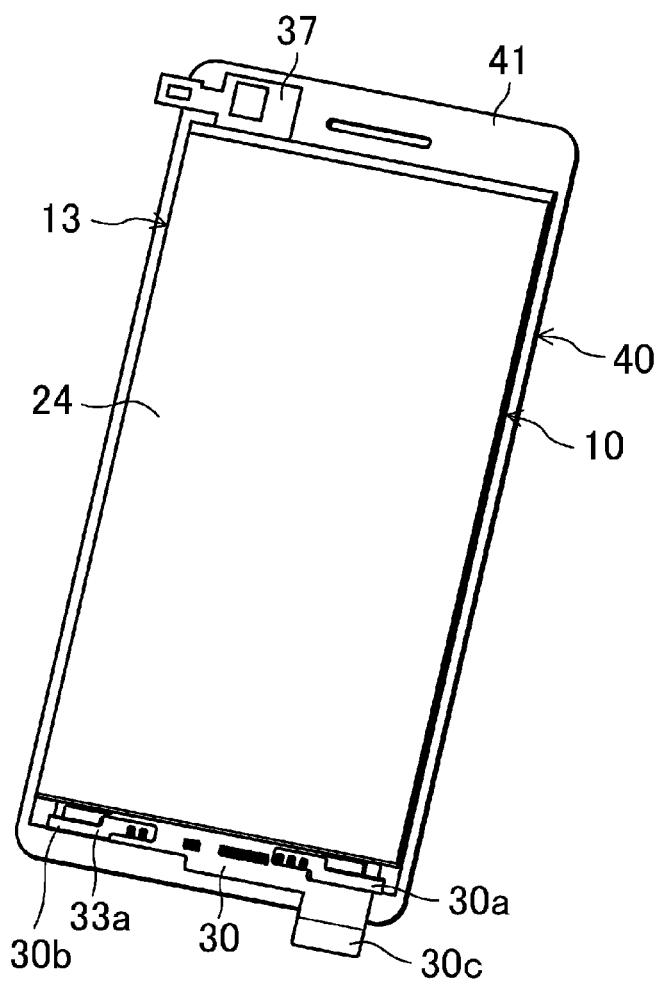
FIG. 15 is a perspective view illustrating folded extension portions.
Figure 16:
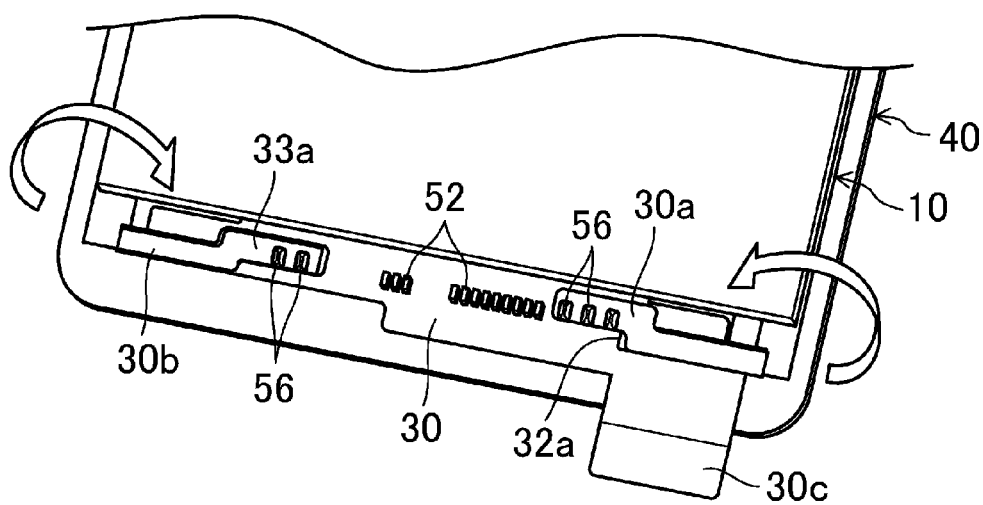
FIG. 16 is a perspective view illustrating a liquid crystal display device in which extension portions are folded.
Figure 17:
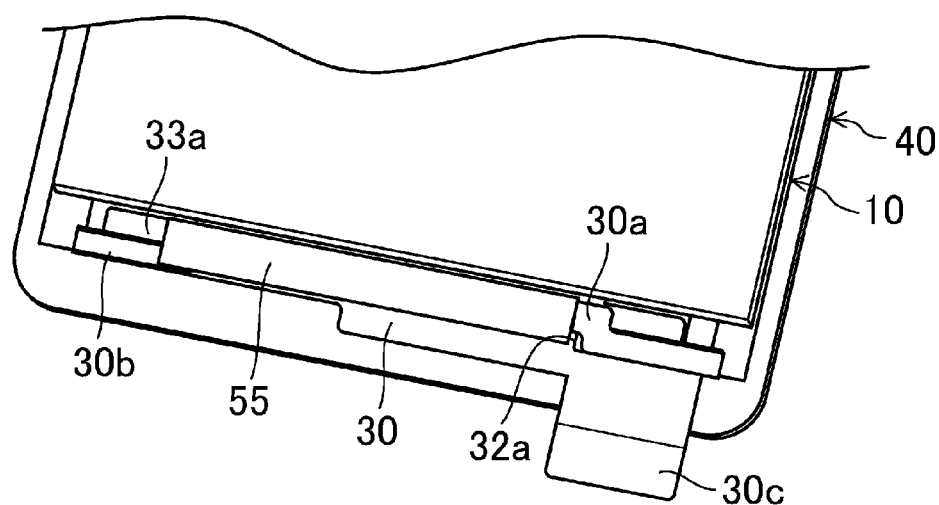
FIG. 17 is a perspective view illustrating an insulating tape member which fixes extension portions.

FIG. 15 is a perspective view illustrating folded extension portions 30a, 30b, 32a, and 33a. FIG. 16 is a perspective view illustrating the liquid crystal display device 1 in which the extension portions 30a, 30b, 32a, and 33a are folded. FIG. 17 is a perspective view illustrating an insulating tape member 55 which fixes the extension portions 30a, 30b, 32a, and 33a.

In this embodiment, the liquid crystal display device 1 will be described as an example display device according to the present disclosure. The liquid crystal display device 1 forms, for example, a display device of a smart phone. As illustrated in FIG. 1 and FIG. 2, the liquid crystal display device 1 includes a panel laminated body 10 including a liquid crystal display panel 12 serving as a display panel, and a substrate member 40 stacked on the panel laminated body 10.

As illustrated in FIG. 5, the liquid crystal display device 1 includes a display area 2 in which display is performed by the liquid crystal display panel 12 and a non-display area 3 formed in the circumference of the display area 2. As illustrated in FIG. 2, the substrate member 40 is attached to the liquid crystal display panel 12 with an adhesive layer 45 interposed therebetween. The liquid crystal display device 1 further includes a step portion 7 formed at least by a side portion of the liquid crystal display panel 12 and a side portion of the adhesive layer 45 such that a void 6 is generated in a part between the liquid crystal display panel 12 and the substrate member 40.

Panel Laminated Body

The panel laminated body 10 includes a plurality of rectangular panels 12 and 13 which are stacked on each other such that respective short sides of the rectangular panels 12 and 13 extend in the same direction. The plurality of panels 12 and 13 are a liquid crystal display panel 12 and a back light unit 13 serving as a light device stacked on the liquid crystal display panel 12 to supply light to the display area 2.

As illustrated in FIG. 1, each of FPCs 30 and 32, serving as a flexible printed circuit board, is connected to a corresponding one of respective short sides of the liquid crystal display panel 12 and the back light unit 13 arranged in one of side portions of the panel laminated body 10.

The FPC 30 and 32 are a main FPC 30 serving as a single main flexible printed circuit board including a connector 35, and at least a single first sub FPC 32 serving as a sub flexible printed circuit board which does not include a connector.

Liquid Crystal Display Panel

As illustrated in FIG. 2, the liquid crystal display panel 12 includes a TFT substrate 18 in which a plurality of TFTs (not illustrated) serving as switching elements are formed, an opposing substrate 19 disposed so as to face the TFT substrate 18, and a liquid crystal layer (not illustrated) sealed between the TFT substrate 18 and the opposing substrate 19. A polarizing plate 20 is attached to an opposite surface of the TFT substrate 18 to a surface thereof which faces the opposing substrate 19. A polarizing plate 21 is attached to an opposite surface of the opposing substrate 19 to a surface thereof which faces the TFT substrate 18.

The TFT substrate 18 includes a short-side area which does not face the opposing substrate 19, and the short-side area forms the step portion 7. A side surface of the TFT substrate 18, a side surface of the opposing substrate 19, and a side surface of the adhesive layer 45 form the step portion 7. A driver IC 27 serving as a circuit member and the main FPC 30 are connected to the short-side area of the TFT substrate 18. The driver IC 27 includes a drive circuit which drive-controls the liquid crystal display panel 12.

As illustrated in FIG. 1, the main FPC 30 includes a first extension portion 30a and a second extension portion 30b each of which outwardly extends from a side area 5 of the panel laminated body 10 in a short-side direction of the liquid crystal display panel 12 in the side area 5.

As illustrated in FIG. 1, tip ends of each of the extension portions 30a and 30b extend outwardly from both sides of the liquid crystal display panel 12 in the short-side direction such that the tip ends extend in opposite directions. Also, each of the extension portions 30a and 30b is formed to have a crank shape such that each of respective base-end side portions of the extension portions 30a and 30b is separated from the side portion of the panel laminated body 10 in which the main FPC 30 is provided with a more distance, as compared to a corresponding one of respective tip-end side portions of the extension portions 30a and 30b.

Furthermore, the main FPC 30 includes a tip end portion 30c which protrudes in a long-side direction of the liquid crystal display panel 12 in the side area 5 of the panel laminated body 10. The connector 35 including a connection terminal is provided in the tip end portion 30c.

Back Light Unit

As illustrated in FIG. 2, the back light unit 13 is disposed on an opposite side of the liquid crystal display panel 12 to a side thereof which faces the substrate member 40. The back light unit 13 includes a light guide plate 22 having a rectangular plate shape, a plurality of LEDs (not illustrated), serving as light sources, disposed on side surfaces of the light guide plate 22 to face one another, a plurality of optical sheets 25 provided on a side of the light guide plate 22, which faces the liquid crystal display panel 12, and a reflection plate 24 provided on an opposite side of the light guide plate 22 to the side on which the optical sheets 25 are provided. The light guide plate 22, the LEDs, the optical sheets 25, and the reflection plate 24 are held by a frame 23 made of resin. Thus, the back light unit 13 as a whole is formed to have a rectangular plate shape.

The first sub FPC 32 serving as a second sub flexible printed circuit board is connected to a short side of the back light unit 13. As illustrated in FIG. 1, the first sub FPC 32 includes a fourth extension portion 32a which extends outwardly from the side area 5 of the panel laminated body 10 in a short-side direction of the back light unit 13. In a state where the fourth extension portion 32a is superimposed on the first extension portion 30a of the main FPC 30, the fourth extension portion 32a is electrically connected to the first extension portion 30a by soldering or the like and, as illustrated in FIG. 15 and FIG. 16, is folded in the side area 5 of the panel laminated body 10.

Substrate Member

As illustrated in FIG. 1, the substrate member 40 includes a cover substrate 41 to which a protective film 42 is attached and a touch panel 44 attached to the cover substrate 41 with a resin film 43 interposed therebetween. The substrate member 40 is attached to the liquid crystal display panel 12 of the panel laminated body 10 with a resin film 45 interposed therebetween such that a side of the substrate member 40 on which the touch panel 44 is provided is attached to the liquid crystal display panel 12.

The cover substrate 41 is made of, for example, a glass substrate or the like. An FPC 37 used for transmitting a control signal and the like to the touch panel 44 is connected to a short side of the touch panel 44 located at an opposite side to a side in which the side area 5 of the panel laminated body 10 is provided.

As illustrated in FIG. 2, the substrate member 40 includes a side end portion 40a protruding beyond the panel laminated body 10 in the side in which the side area 5 of the panel laminated body 10 is provided. The side end portion 40a includes a short-side area of each of the cover substrate 41 and the touch panel 44.

The substrate member 40 includes an operation section 4 formed in the non-display area 3 of the liquid crystal display device 1 and used for performing an input operation on the touch panel 44. That is, a light shielding film (not illustrated) is formed on the cover substrate 41 of the side end portion 40a and, as illustrated in FIG. 5, a plurality of icons serving as operation sections 4 is formed in the shielding film by a pattern which transmits light. In this embodiment, for example, four operation sections 4 disposed in predetermined intervals in the substrate member 40.

Light Source Unit

As illustrated in FIG. 2, a light source unit 50 is provided in the side end portion 40a of the substrate member 40. The light source unit 50 and the back light unit 13 are provided separately and independently from each other. The light source unit 50 is a light source which supplies illumination light to the plurality of operation sections 4 so as to light the operation sections 4, and is attached to an opposite surface of the touch panel 44 to a surface thereof which faces the cover substrate 41. The light source unit 50 is disposed in the void 6 between the substrate member 40 and the liquid crystal display panel 12 such that at least a part of the light source unit 50 is superimposed on the liquid crystal display panel 12 in the step portion 7.

As illustrated in FIG. 3 and FIG. 4, the light source unit 50 includes LEDs 74 serving as light sources, a light guide plate 51 which light emitted from each of the LEDs 74 enters, a light shielding member 71 which is provided in the circumference of the light guide plate 51 and has a frame shape, and a second sub FPC 33 serving as a flexible printed circuit board which controls the LEDs 74 provided in an opposite side of the light guide plate 51 to a side thereof which faces the substrate member 40.

The light guide plate 51 is formed to have a strip shape, and is attached to the second sub FPC 33 with a white double-faced tape 72, serving as a reflection member, interposed therebetween in a state where the light guide plate 51 is disposed so as to extend in a short-side direction of the substrate member 40. The double-faced tape 72 has a structure in which an adhesive layer is provided on each of both surfaces of a white sheet member, and has the same strip shape as that of the light guide plate 51. The LEDs 74 are disposed on both end sides of the light guide plate 51 and are mounted on the second sub FPC 33.

The light shielding member 71 is disposed so as to surround the LEDs 74, the light guide plate 51, and the double-faced tape 72, and is attached to the second sub FPC 33. Thus, light emitted from the LEDs 74 enters the light guide plate 51 from both ends thereof and disperses in the light guide plate 51, and a part of the light is reflected by the white double-faced tape 72, so that illumination light is output from a surface of the light guide plate 51 which faces the substrate member 40.

Thus, while the first sub FPC 32 is provided in the side portion of the panel laminated body 10, the second sub FPC 33 is provided in the side end portion 40a of the substrate member 40. As illustrated in FIG. 3, in the second sub FPC 33, the thickness of an area of the liquid crystal display panel 12 which faces the driver IC 27 is smaller than that of other area thereof. Thus, the second sub FPC 33 and the driver IC 27 do not contact each other.

As illustrated in FIG. 1, the second sub FPC 33 includes a third extension portion 33a serving as an extension portion which outwardly extends from the side area 5 of the panel laminated body 10 in a short-side direction of the substrate member 40 in the side area 5. The third extension portion 33a is superimposed on the second extension portion 30b of the main FPC 30.

As illustrated in FIGS. 15 and 16, in a state where the third extension portion 33a of the second sub FPC 33 is superimposed on the second extension portion 30b of the main FPC 30, the third extension portion 33a is electrically connected to the second extension portion 30b by soldering or the like, and is folded in the side area 5 of the panel laminated body 10.

As illustrated in FIG. 17, the first to fourth extension portions 30a, 30b, 32a, and 33a are fixed to the main FPC 30 by the insulating tape member 55 which covers electrically connected portions 56 soldered or the like in the extension portions 30a, 30b, 32a, and 33a, and an element 52 formed in the main FPC 30.

Thus, the folded second and third extension portions 30b and 33a and the folded first and fourth extension portions 30a and 32a are disposed such that the extension portions 30a, 30b, 32a, and 33a as a whole are entirely superposed on the side end portion 40a of the substrate member 40. That is, all of the extension portions 30a, 30b, 32a, and 33a is efficiently disposed in a space which corresponds to the side area 5 of the panel laminated body 10 and is superimposed on the side end portion 40a of the substrate member 40.

Thus, the liquid crystal display device 1 is configured such that control signals of a plurality of types are input and output from and to the connector 35 of the main FPC 30 to thereby control all of the back light unit 13, the liquid crystal display panel 12, and the light source unit 50.

That is, a control signal and the like are supplied to the back light unit 13 from the connector 35 through the main FPC 30 and the first sub FPC 32. Also, a control signal and the like are supplied to the liquid crystal display panel 12 from the connector 35 through the main FPC 30. Furthermore, a control signal and the like are supplied to the light source unit 50 from the connector 35 through the main FPC 30 and the second sub FPC 33.

Thus, the light source unit 50 is controlled separately and independently from the back light unit 13, and is configured to supply light to icons serving as the operation sections 4 formed in the side end portion 40a of the substrate member 40 to light the operation sections 4. When a user touches one of the icons which are lit, a touch position of the user then is detected by the touch panel 44.

Fabrication Method

Next, a method for fabricating the liquid crystal display device 1 will be described.

Figure 6:
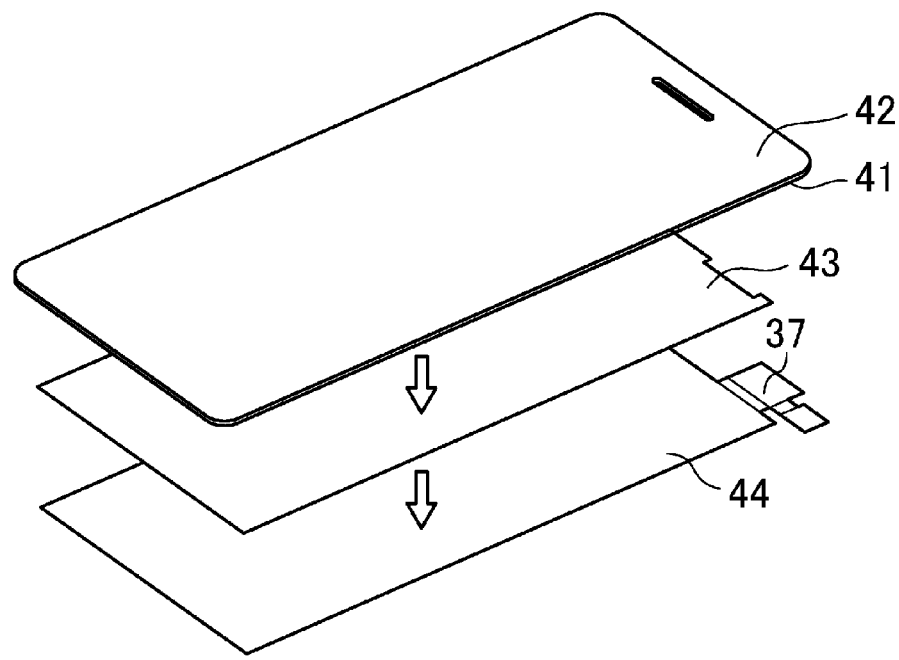
FIG. 6 is a perspective view illustrating a cover substrate, a resin film, and a touch panel.
Figure 7:
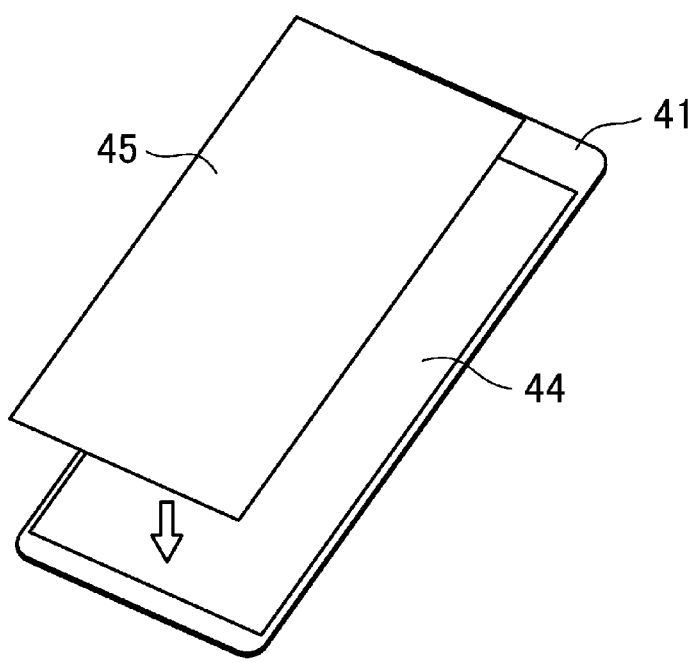
FIG. 7 is a perspective view illustrating an adhesive layer to be attached to the touch panel.
Figure 8:
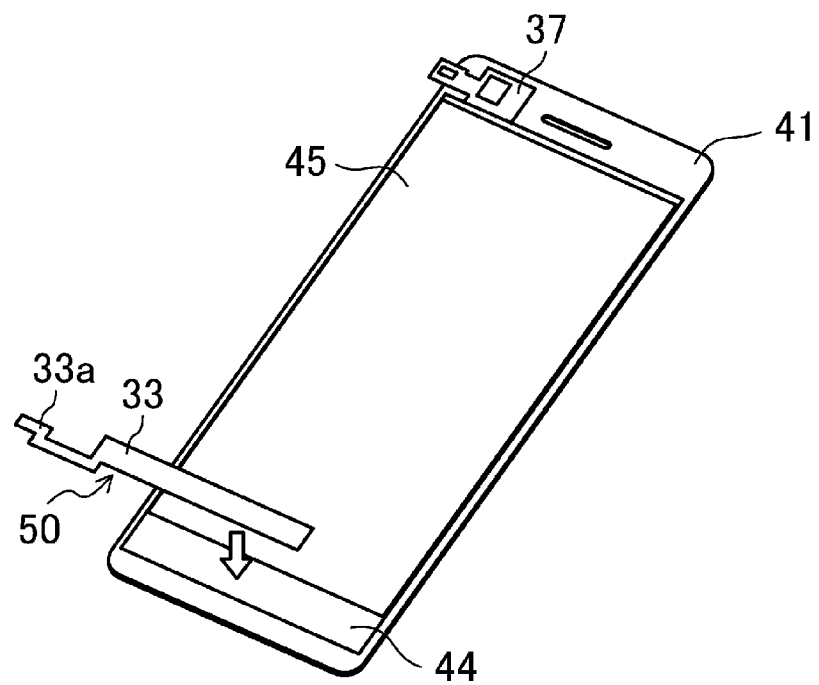
FIG. 8 is a perspective view illustrating a second sub FPC and a cover substrate.
Figure 9:
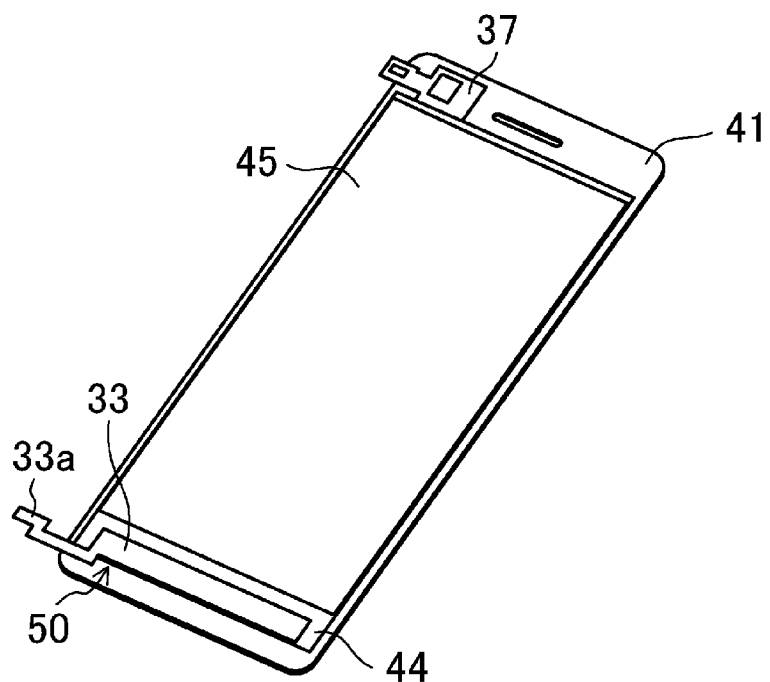
FIG. 9 is a perspective view illustrating a second sub FPC attached to a cover substrate.
Figure 10:
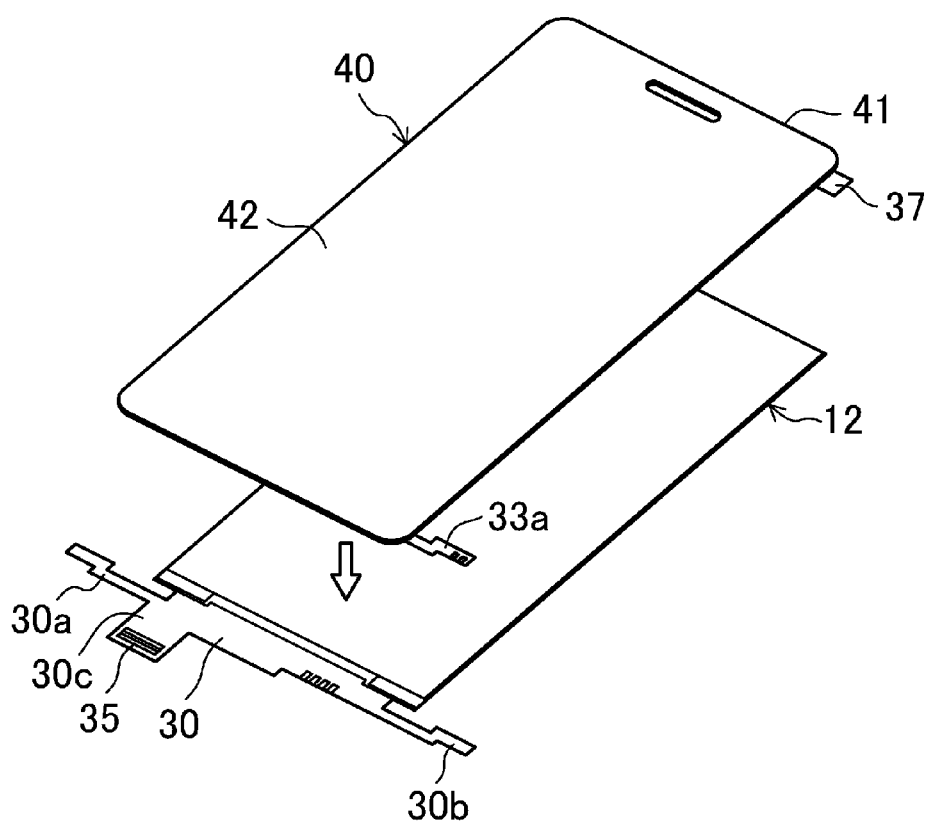
FIG. 10 is a perspective view illustrating a substrate member and a liquid crystal display panel.

FIG. 6 is a perspective view illustrating the cover substrate 41, the resin film 43, and the touch panel 44. FIG. 7 is a perspective view illustrating the adhesive layer 45 to be attached to the touch panel 44. FIG. 8 is a perspective view illustrating the second sub FPC 33 and the cover substrate 41. FIG. 9 is a perspective view illustrating the second sub FPC 33 attached to the cover substrate 41. FIG. 10 is a perspective view illustrating the substrate member 40 and the liquid crystal display panel 12.

Figure 11:
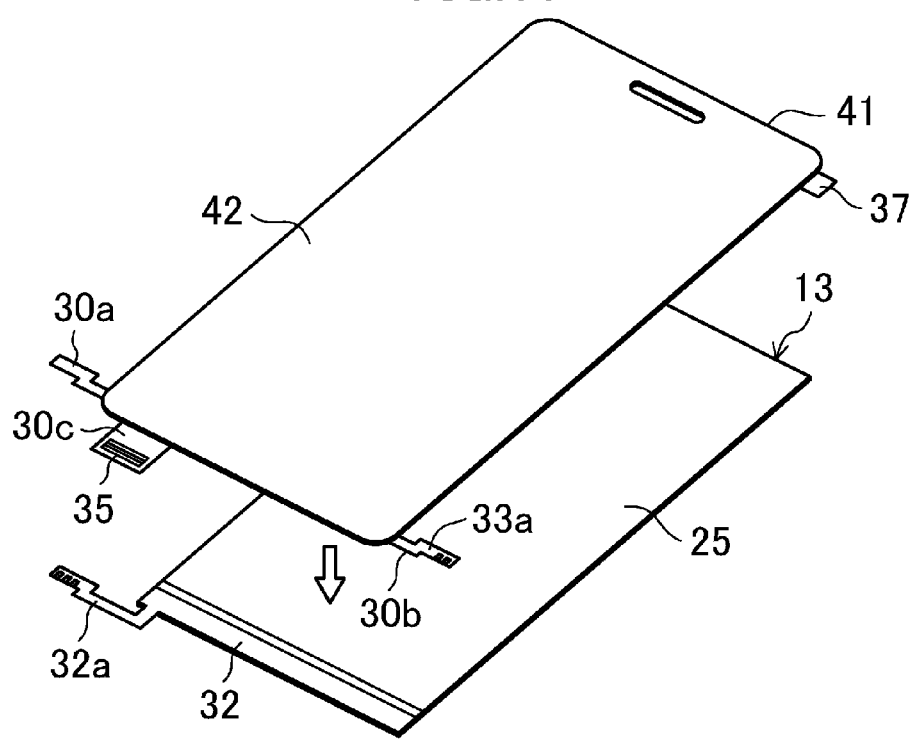
FIG. 11 is a perspective view illustrating a substrate member on which a liquid crystal display panel is superimposed, and a back light unit.
Figure 12:
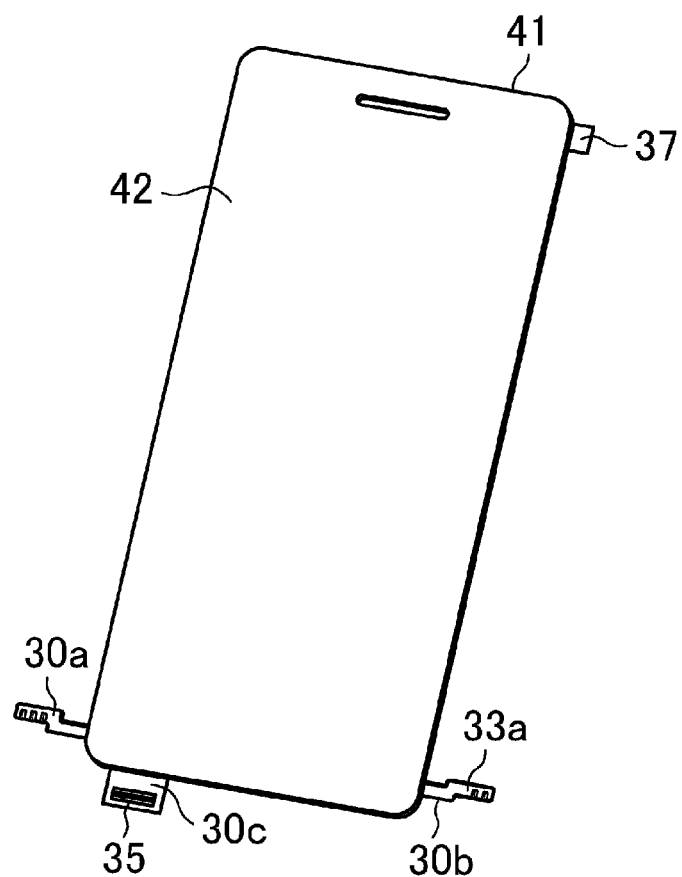
FIG. 12 is a perspective view illustrating a substrate member on which a back light unit is superimposed.
Figure 13:
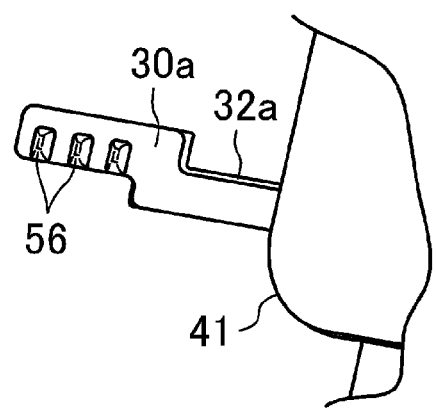
FIG. 13 is an enlarged perspective view illustrating first and fourth extension portions connected to each other.
Figure 14:
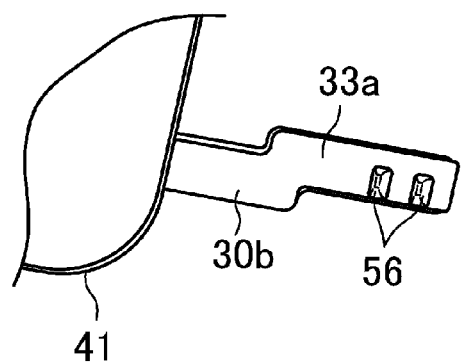
FIG. 14 is an enlarged perspective view illustrating second and third extension portions connected to each other.

FIG. 11 is a perspective view illustrating the substrate member 40 on which the liquid crystal display panel 12 is superimposed, and the back light unit 13. FIG. 12 is a perspective view illustrating the substrate member 40 on which the back light unit 13 is superimposed. FIG. 13 is an enlarged perspective view illustrating the first and fourth extension portions 30a and 32a connected to each other. FIG. 14 is an enlarged perspective view illustrating the second and third extension portions 30b and 33a connected to each other.

First, as illustrated in FIG. 6, the cover substrate 41 and the touch panel 44 are attached with each other with the resin film 43 interposed therebetween. The protective film 42 is attached to the cover substrate 41 in advance. Next, as illustrated in FIG. 7, the resin film 45 is attached to the touch panel 44 which has been attached to the cover substrate 41. The resin film 45 is shorter than the touch panel 44 in a long-side direction of the resin film 45. Therefore, as illustrated in FIG. 8, in an area of the substrate member 40 which is to be the side end portion 40a, one of short-side areas of the touch panel 44 is exposed from the resin film 45.

As illustrated in FIG. 4, the light guide plate 51 is attached to the second sub FPC 33 on which the LEDs 74 are mounted with the white double-faced tape 72 interposed therebetween. Furthermore, the light shielding member 71 having a rectangular frame shape is attached to the second sub FPC 33 so as to surround the LEDs 74, the light guide plate 51, and the double-faced tape 72. Thereafter, as illustrated in FIG. 2 and FIG. 9, the light source unit 50 is attached to the exposed area of the touch panel 44 from the resin film 45 with a dispersion layer 73 interposed therebetween. Thus, the substrate member 40 is formed.

Next, as illustrated in FIG. 10, the substrate member 40 is disposed so as to face the liquid crystal display panel 12. In this disposing process, the substrate member 40 is disposed such that the third extension portion 33a of the second sub FPC 33 in the light source unit 50 faces the second extension portion 30b of the main FPC 30. Then, in a vacuum environment, the substrate member 40 is attached to the liquid crystal display panel 12 via the adhesive layer 45.

Next, as illustrated in FIG. 11, the liquid crystal display panel 12 attached to the substrate member 40 and the back light unit 13 to which the first sub FPC 32 is connected are attached to each other. In this attaching process, the back light unit 13 is attached to the liquid crystal display panel 12 such that the fourth extension portion 32a of the back light unit 13, located in the first sub FPC 32, faces the first extension portion 30a of the main FPC 30.

Subsequently, as illustrated in FIG. 12 and FIG. 13, the first extension portion 30a of the main FPC 30 and the fourth extension portion 32a of the first sub FPC 32 provided in the back light unit 13 are electrically connected to each other by soldering or the like. Thus, as illustrated in FIG. 13, the electrically connected portions 56 are formed in the first extension portion 30a and the fourth extension portion 32a by soldering or the like.

As illustrated in FIG. 12 and FIG. 14, the second extension portion 30b of the main FPC 30 and the third extension portion 33a of the second sub FPC 33 provided in the light source unit 50 are electrically connected to each other by soldering or the like. Thus, as illustrated in FIG. 14, the electrically connected portions 56 are formed also in the second extension portion 30b and the third extension portion 33a by soldering or the like.

Next, as illustrated in FIG. 15 and FIG. 16, the first and fourth extension portions 30a and 32a which extend outwardly from the side area 5 of the panel laminated body 10 in the short-side direction of the panels 12, and 13 in the side area 5 and are electrically connected to each other in a state where the first and fourth extension portions 30a and 32a are superimposed on each other are folded in the side area 5 of the panel laminated body 10. Similarly, the second and third extension portions 30b and 33a are folded in the side area 5 of the panel laminated body 10.

Subsequently, as illustrated in FIG. 17, the folded first and fourth extension portions 30a and 32a and the folded second and third extension portions 30b and 33a are attached and fixed to the main FPC 30 by the insulating tape member 55. Thus, the liquid crystal display device 1 is fabricated.

Advantages of First Embodiment

Therefore, according to the first embodiment, the operation sections 4 are lit by illumination light supplied from the light source unit 50, and thus, even when illumination intensity in a use environment is relatively low, the plurality of operation sections 4 can be visibly recognized easily. As a result, the operability of the liquid crystal display device 1 can be greatly increased. Furthermore, the step portion 7 is formed in the side portions of the liquid crystal display panel 12 and the adhesive layer 45 such that a part of the light source unit 50 is superimposed on the liquid crystal display panel 12 in the step portion 7, and thus, the light source unit 50 can be provided in the liquid crystal display device 1 without increasing the width of the non-display area 3.

Furthermore, the light source unit 50 includes the LEDs 74 and the light guide plate 51, and thus, a wide area can be illuminated by a relatively small number of the LEDs 74. In addition, as compared to a case where a large number of light sources are disposed so as to emit illumination light directly to the operation sections 4, the thickness of the light source unit 50 can be reduced.

In an area in which the thickness of the second sub FPC 33 is relatively small, the light source unit 50 is disposed so as to be superimposed on the driver IC 27, and thus, the thickness of the non-display area 3 can be reduced without increasing the width of the non-display area 3.

Moreover, lighting of the operation sections 4 can be controlled separately and independently from display performed by the back light unit 13 in the display area 2. Thus, lighting and turning off of the operation sections 4 can be controlled separately and independently from a display state in the display area 2, and the brightness in the lighting state of the operation sections 4 can be controlled. As a result, power consumption can be reduced.

Furthermore, even when the liquid crystal display device 1 includes the panel laminated body 10 in which a plurality of layers of panels, that is, the panels 12 and 13 which include the FPCs 30 and 32, respectively, each of the extension portions 30a and 32a which extend outwardly from the side area 5 of the panel laminated body 10 in the short-side direction of the panels 12 and 13 is formed at least in a part of a corresponding one of the FPCs 30 and 32, at least a pair of extension portions, that is, the first and fourth extension portions 30a and 32a, are electrically connected to each other in a state where the first and fourth extension portions 30a and 32a are superimposed on each other, and the first and fourth extension portions 30a and 32a are folded in the side area 5 of the panel laminated body 10. Thus, the plurality of FPCs can be compactly disposed in the side area 5 of the panel laminated body 10 so as not to be superimposed on the panel laminated body 10.

As a result, even when the number of the FPCs increases as the number of panels increases, the thickness of the entire liquid crystal display device 1 can be reduced. Furthermore, the plurality of FPCs, that is, the FPCs 30 and 32, are electrically connected directly to each other without a connector interposed therebetween in the first and fourth extension portions 30a and 32a, and thus, the number of connectors can be reduced. Therefore, the space for connecters and the component cost can be greatly reduced.

Second Embodiment

Figure 18:
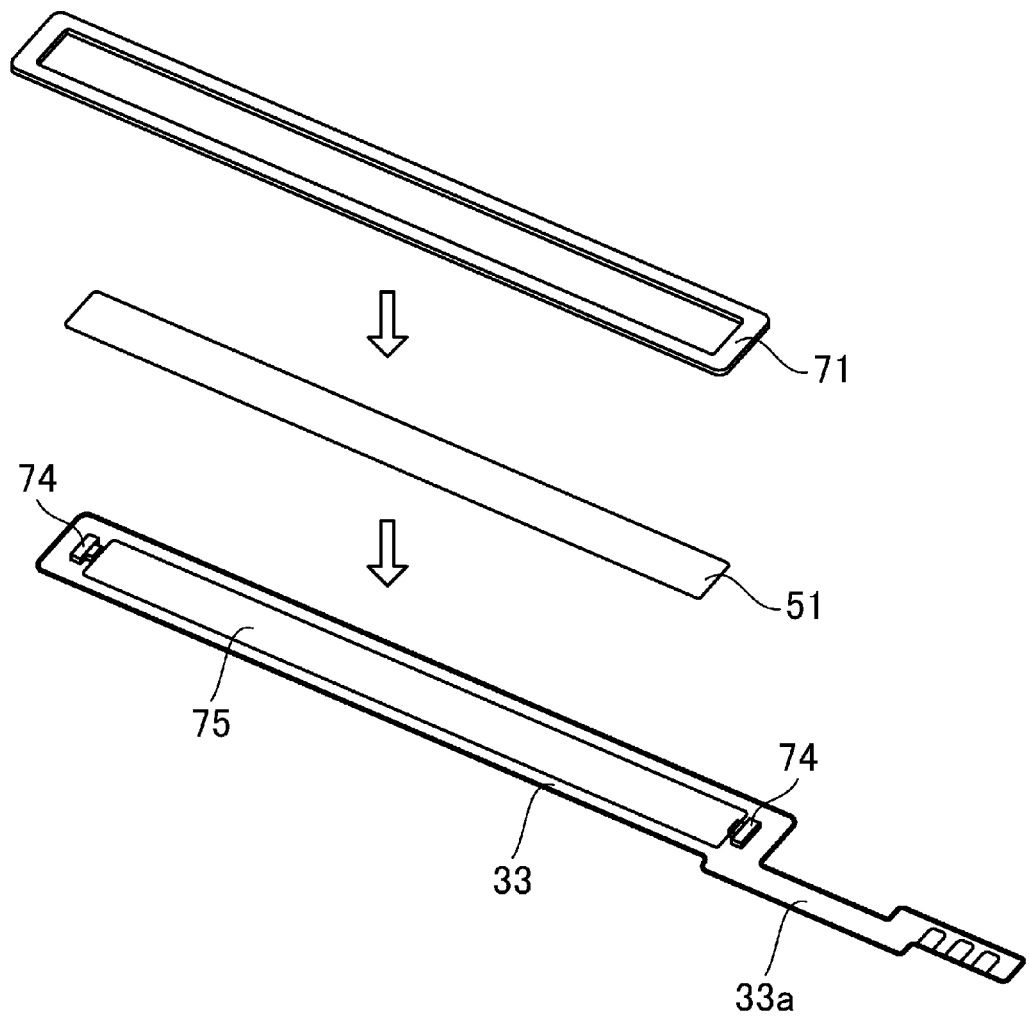
FIG. 18 is a perspective view illustrating a structure of a light source unit according to a second embodiment.

FIG. 18 illustrates a second embodiment.

FIG. 18 is a perspective view illustrating a structure of a light source unit 50 according to a second embodiment. Note that, in each of the following embodiments, each of the same parts as those illustrated in FIGS. 1-17 is denoted by the same reference character, and therefore, the detail description thereof will be partially omitted.

The light source unit 50 of the second embodiment has a structure obtained by partially modifying the structure of the light source unit 50 of the first embodiment and, other than that, the structure of the light source unit 50 of the second embodiment is similar to that of the first embodiment.

As illustrated in FIG. 1 and FIG. 2, the liquid crystal display device 1 includes a panel laminated body 10 including a liquid crystal display panel 12 serving as a display panel, and a substrate member 40 stacked on the panel laminated body 10.

As illustrated in FIG. 5, the liquid crystal display device 1 includes a display area 2 in which display is performed by the liquid crystal display panel 12, and a non-display area 3 formed in the circumference of the display area 2. As illustrated in FIG. 2, the substrate member 40 is attached to the liquid crystal display panel 12 with an adhesive layer 45 interposed therebetween. The liquid crystal display device 1 further includes a step portion 7 formed at least by a side portion of the liquid crystal display panel 12 and a side portion of the adhesive layer 45 such that a void 6 is generated in a part between the liquid crystal display panel 12 and the substrate member 40.

The panel laminated body 10 includes the liquid crystal display panel 12 and a back light unit 13 serving as a light device stacked on the liquid crystal display panel 12 to supply light to the display area 2. As illustrated in FIG. 2, the liquid crystal display panel 12 includes a TFT substrate 18, and an opposing substrate 19 disposed so as to face the TFT substrate 18.

The TFT substrate 18 includes a short-side area which does not face the opposing substrate 19, and the short-side area forms the step portion 7. A side surface of the TFT substrate 18, a side surface of the opposing substrate 19, and a side surface of the adhesive layer 45 form the step portion 7. A driver IC 27 serving as a circuit member and a main FPC 30 are connected to the short-side area of the TFT substrate 18.

As illustrated in FIG. 1, the substrate member 40 includes a cover substrate 41 to which a protective film 42 is attached and a touch panel 44 attached to the cover substrate 41 with a resin film 43 interposed therebetween. The substrate member 40 is attached to the liquid crystal display panel 12 of the panel laminated body 10 with a resin film 45 interposed therebetween such that a side of the substrate member 40 on which the touch panel 44 is provided is attached to the liquid crystal display panel 12. As illustrated in FIG. 2, the substrate member 40 includes a side end portion 40a protruding beyond the panel laminated body 10 in a side in which the side area 5 of the panel laminated body 10 is provided.

The substrate member 40 includes operation sections 4 formed in the non-display area 3 of the liquid crystal display device 1 and used for performing an input operation on the touch panel 44. That is, a light shielding film (not illustrated) is formed on the cover substrate 41 of the side end portion 40a and, as illustrated in FIG. 5, a plurality of icons serving as operation sections 4 is formed in the shielding film by a pattern which transmits light.

As illustrated in FIG. 2, a light source unit 50 which supplies illumination light to the plurality of operation sections 4 so as to light the operation sections 4 is provided separately and independently from the back light unit 13 in the side end portion 40a of the substrate member 40. The light source unit 50 is disposed in the void 6 between the substrate member 40 and the liquid crystal display panel 12 such that at least a part of the light source unit 50 is superimposed on the liquid crystal display panel 12 in the step portion 7.

As illustrated in FIG. 18, the light source unit 50 includes LEDs 74 serving as light sources, a light guide plate 51 which light emitted from each of the LEDs 74 enters, a light shielding member 71 which is provided in the circumference of the light guide plate 51 and has a frame shape, and a second sub FPC 33 serving as a flexible printed circuit board which controls the LEDs 74 provided in an opposite side of the light guide plate 51 to a side thereof which faces the substrate member 40.

In the second sub FPC 33 of this embodiment, a reflection layer 75 which reflects light emitted from the light guide plate 51 to the second sub FPC 33 to the light guide plate 51 is printed in an area in which the light guide plate 51 having a strip shape is disposed. The reflection layer 75 is constituted by, for example, a layer of a white or metallic color and formed by silk screen printing or the like. Therefore, unlike the first embodiment, the light source unit 50 of this embodiment does not include a double-faced tape 72, and the thickness of the light source unit 50 has a smatter thickness than that of the light source unit 50 of the first embodiment.

The light shielding member 71 is disposed so as to surround the LEDs 74, the light guide plate 51, and the reflection layer 75, and is attached to the second sub FPC 33. In the second sub FPC 33, the thickness of an area which faces the driver IC 27 of the liquid crystal display panel 12 is smaller than that of other area thereof. Thus, the second sub FPC 33 and the driver IC 27 do not contact each other.

Thus, the light source unit 50 is controlled separately and independently from the back light unit 13 and supplies light to the icons serving as the operation sections 4 formed in the side end portion 40a of the substrate member 40 to light the operation sections 4. When a user touches one of the icons which are lit, a touch position of the user then is detected by the touch panel 44.

Fabrication Method

First, similar to the first embodiment, the cover substrate 41 and the touch panel 44 are attached with each other with the resin film 43 interposed therebetween. Next, the resin film 45 is attached to the touch panel 44 which has been attached to the cover substrate 41. In this attaching process, in an area of the substrate member 40 which is to be the side end portion 40a, one of short-side areas of the touch panel 44 is exposed from the resin film 45.

As illustrated in FIG. 18, the reflection layer 75 is formed in the second sub FPC 33 by silk screen printing or the like. The LEDs 74 are mounted on the second sub FPC 33. Thereafter, the light guide plate 51 is disposed in and fixed to an area in which the reflection layer 75 is printed. Furthermore, the light shielding member 71 having a rectangular frame shape is attached to the second sub FPC 33 so as to surround the LEDs 74, the light guide plate 51, and the reflection layer 75. Then, the light source unit 50 is attached to the exposed area of the touch panel 44 from the resin film 45 with a dispersion layer 73 interposed therebetween. Thus, the substrate member 40 is formed.

Next, the substrate member 40 is attached to the liquid crystal display panel 12 via the adhesive layer 45. Thereafter, the liquid crystal display panel 12 which has been attached to the substrate member 40 and the back light unit 13 are attached to each other.

Subsequently, the first extension portion 30a of the main FPC 30 and the fourth extension portion 32a of the first sub FPC 32 provided in the back light unit 13 are electrically connected to each other by soldering or the like. The second extension portion 30b of the main FPC 30 and the third extension portion 33a of the second sub FPC 33 provided in the light source unit 50 are electrically connected to each other by soldering or the like.

Next, each of the pair of the first and fourth extension portions 30a and 32a, and the pair of the second and third extension portions 30b and 33a is folded in the side area 5 of the panel laminated body 10. Subsequently, the folded first and fourth extension portions 30a and 32a and the folded second and third extension portions 30b and 33a are attached and fixed to the main FPC 30 by the insulating tape member 55. Thus, the liquid crystal display device 1 is fabricated.

Advantages of Second Embodiment

Therefore, according to the second embodiment, similar to the first embodiment, the operation sections 4 are lit by illumination light supplied from the light source unit 50, and thus, even when illumination intensity in a use environment is relatively low, the plurality of operation sections 4 can be visibly recognized easily. As a result, the operability of the liquid crystal display device 1 can be greatly increased. Furthermore, the step portion 7 is formed in the side portions of the liquid crystal display panel 12 and the adhesive layer 45 such that a part of the light source unit 50 is superimposed on the liquid crystal display panel 12, and thus, the light source unit 50 can be provided in the liquid crystal display device 1 without increasing the width of the non-display area 3.

In addition, light emitted from the light guide plate 51 to the second sub FPC 33 can be caused to be reflected to the reflection layer 75 of the second sub FPC 33, enter the light guide plate 51 again and then be output to the operation sections 4, and thus, light of the LEDs 74 can be effectively used. Furthermore, the reflection layer 75 is printed directly on the second sub FPC 33, and thus, a reflection member used specifically for reflecting light from the light guide plate 51 is not needed, resulting in further reduction in thickness of the light source unit 50. Therefore, without increasing the size of the void 6 between the liquid crystal display panel 12 and the substrate member 40, the light source unit 50 can be disposed in the void 6.

Third Embodiment

Figure 19:
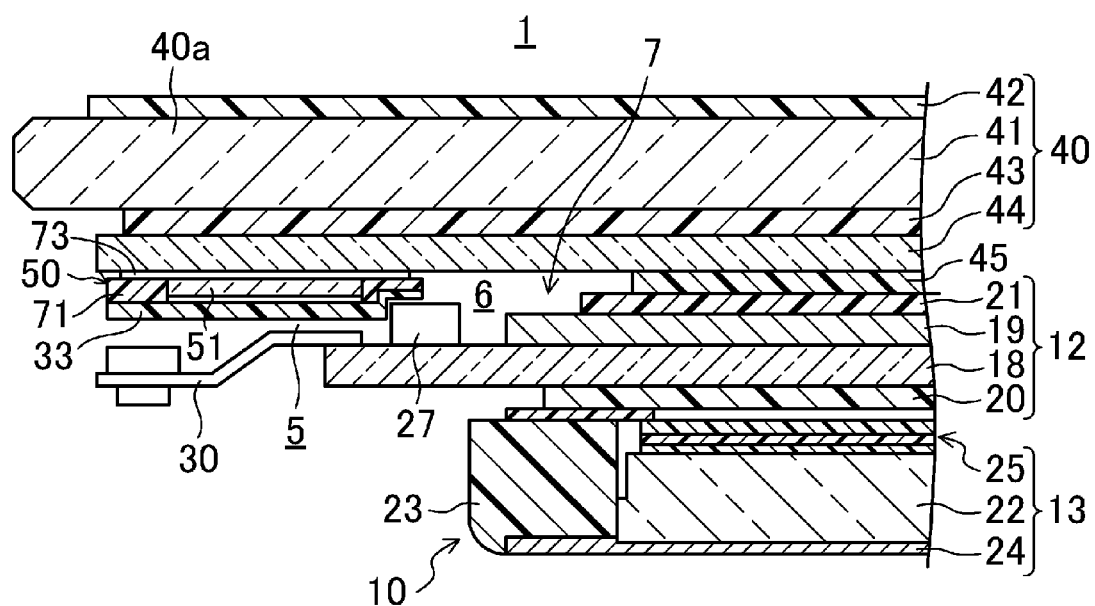
FIG. 19 is an enlarged cross-sectional view illustrating a side portion of a liquid crystal display device according to a third embodiment.
Figure 20:
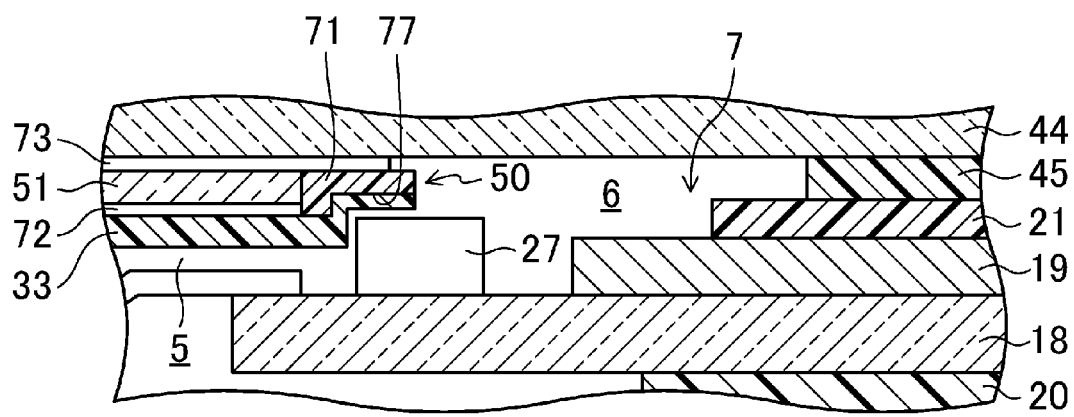
FIG. 20 is an enlarged cross-sectional view illustrating a part of FIG. 19.

FIG. 19 and FIG. 20 illustrate a third embodiment.

FIG. 19 is an enlarged cross-sectional view illustrating a side portion of a liquid crystal display device 1 according to a third embodiment. FIG. 20 is an enlarged cross-sectional view illustrating a part of FIG. 19.

The light source unit 50 of the third embodiment has a structure obtained by partially modifying the structure of the light source unit 50 of the first embodiment and, other than that, the structure of the light source unit 50 of the second embodiment is similar to that of the first embodiment.

As illustrated in FIG. 19, the liquid crystal display device 1 includes a panel laminated body 10 including a liquid crystal display panel 12 serving as a display panel, and a substrate member 40 stacked on the panel laminated body 10.

As illustrated in FIG. 5, the liquid crystal display device 1 includes a display area 2 in which display is performed by the liquid crystal display panel 12 and a non-display area 3 formed in the circumference of the display area 2. As illustrated in FIG. 19, the substrate member 40 is attached to the liquid crystal display panel 12 with an adhesive layer 45 interposed therebetween. The liquid crystal display device 1 further includes a step portion 7 formed at least by a side portion of the liquid crystal display panel 12 and a side portion of the adhesive layer 45 such that a void 6 is generated in a part between the liquid crystal display panel 12 and the substrate member 40.

The panel laminated body 10 includes the liquid crystal display panel 12 and a back light unit 13 serving as a light device stacked on the liquid crystal display panel 12 to supply light to the display area 2. As illustrated in FIG. 19, the liquid crystal display panel 12 includes a TFT substrate 18 and an opposing substrate 19 disposed so as to face the TFT substrate 18.

The TFT substrate 18 includes a short-side area which does not face the opposing substrate 19, and the short-side area forms the step portion 7. A side surface of the TFT substrate 18, a side surface of the opposing substrate 19, and a side surface of the adhesive layer 45 form the step portion 7. A driver IC 27 serving as a circuit member and the main FPC 30 are connected to the short-side area of the TFT substrate 18.

As illustrated in FIG. 19, the substrate member 40 includes a cover substrate 41 to which a protective film 42 is attached and a touch panel 44 attached to the cover substrate 41 with a resin film 43 interposed therebetween. The substrate member 40 is attached to the liquid crystal display panel 12 of the panel laminated body 10 with a resin film 45 interposed therebetween such that a side of the substrate member 40 on which the touch panel 44 is provided is attached to the liquid crystal display panel 12. As illustrated in FIG. 19, the substrate member 40 includes a side end portion 40a protruding beyond the panel laminated body 10 in a side in which the side area 5 of the panel laminated body 10 is provided.

The substrate member 40 includes operation sections 4 formed in the non-display area 3 of the liquid crystal display device 1 and used for performing an input operation on the touch panel 44. That is, a light shielding film (not illustrated) is formed on the cover substrate 41 of the side end portion 40a and, as illustrated in FIG. 5, a plurality of icons serving as the operation sections 4 is formed in the shielding film by a pattern which transmits light.

As illustrated in FIG. 19, a light source unit 50 which supplies illumination light to the operation sections 4 so as to light the operation sections 4 is provided separately and independently from the back light unit 13 in the side end portion 40a of the substrate member 40. The light source unit 50 is disposed in the void 6 between the substrate member 40 and the liquid crystal display panel 12 such that at least a part of the light source unit 50 is superimposed on the liquid crystal display panel 12 in the step portion 7.

As illustrated in FIG. 19 and FIG. 4, the light source unit 50 includes LEDs 74 serving as light sources, a light guide plate 51 which light emitted from each of the LEDs 74 enters, a light shielding member 71 which is provided in the circumference of the light guide plate 51 and has a frame shape, and a second sub FPC 33 serving as a flexible printed circuit board which controls the LEDs 74 provided in an opposite side of the light guide plate 51 to a side thereof which faces the substrate member 40.

The light guide plate 51 is formed to have a strip shape, and is attached to the second sub FPC 33 with a white double-faced tape 72, serving as a reflection member, interposed therebetween in a state where the light guide plate 51 is disposed so as to extend in a short-side direction of the substrate member 40. The double-faced tape 72 has a structure in which an adhesive layer is provided on each of both surfaces of a white sheet member, and has the same strip shape as that of the light guide plate 51. The LEDs 74 are disposed on both end sides of the light guide plate 51 and are mounted on the second sub FPC 33.

The light shielding member 71 is disposed so as to surround the LEDs 74, the light guide plate 51, and the double-faced tape 72, and is attached to the second sub FPC 33. In this embodiment, as illustrated in FIG. 20, a notch portion 77 is formed in the light shielding member 71. The notch portion 77 is formed in an outer edge portion of the light shielding member 71. Therefore, the thickness of the light shielding member 71 is smaller in the notch portion 77 than in other portion thereof. The light source unit 50 is disposed such that a part of the notch portion 77 of the light shielding member 71 is superimposed on the driver IC 27.

The second sub FPC 33 is attached to a surface of the light shielding member 71 to a surface thereof which faces the touch panel 44, and has a smaller thickness in an area thereof which faces the driver IC 27 of the liquid crystal display panel 12 than in other area thereof. In the notch portion 77, a portion in which the second sub FPC 33 has a small thickness is provided. Thus, the light shielding member 71 and the second sub FPC 33 do not contact with the driver IC 27.

As described above, the light source unit 50 is controlled separately and independently from the back light unit 13, and is configured to supply light to icons serving as the operation sections 4 formed in the side end portion 40*a* of the substrate member 40 so as to light the operation sections 4. When a user touches one of the icons which are lit, a touch position of the user then is detected by the touch panel 44.

Fabrication Method

First, similar to the first embodiment, the cover substrate 41 and the touch panel 44 are attached with each other with the resin film 43 interposed therebetween. Next, the resin film 45 is attached to the touch panel 44 which has been attached to the cover substrate 41. In this attaching process, in an area of the substrate member 40 which is to be the side end portion 40*a*, one of short-side areas of the touch panel 44 is exposed from the resin film 45.

As illustrated in FIG. 4, the light guide plate 51 is attached to the second sub FPC 33 on which the LEDs 74 are mounted with the white double-faced tape 72 interposed therebetween. Furthermore, the light shielding member 71 having a rectangular frame shape is attached to the second sub FPC 33 so as to surround the LEDs 74, the light guide plate 51, and the double-faced tape 72. Then, as illustrated in FIG. 19, the light source unit 50 is attached to the exposed area of the touch panel 44 from the resin film 45 with a dispersion layer 73 interposed therebetween. Thus, the substrate member 40 is formed.

Next, the substrate member 40 is attached to the liquid crystal display panel 12 via the adhesive layer 45. Thereafter, the liquid crystal display panel 12 which has been attached to the substrate member 40 and the back light unit 13 are attached to each other.

Subsequently, the first extension portion 30*a* of the main FPC 30 and the fourth extension portion 32*a* of the first sub FPC 32 provided in the back light unit 13 are electrically connected to each other by soldering or the like. The second extension portion 30*b* of the main FPC 30 and the third extension portion 33*a* of the second sub FPC 33 provided in the light source unit 50 are electrically connected to each other by soldering or the like.

Next, each of the pair of the first and fourth extension portions 30*a* and 32*a*, and the pair of the second and third extension portions 30*b* and 33*a* is folded in the side area 5 of the panel laminated body 10. Subsequently, the folded first and fourth extension portions 30*a* and 32*a* and the folded second and third extension portions 30*b* and 33*a* are attached and fixed to the main FPC 30 by the insulating tape member 55. Thus, the liquid crystal display device 1 is fabricated.

Advantages of Third Embodiment

Therefore, according to the third embodiment, similar to the first embodiment, the operation sections 4 are lit by illumination light supplied from the light source unit 50, and thus, even when illumination intensity in a use environment is relatively low, the operation sections 4 can be visibly recognized easily. As a result, the operability of the liquid crystal display device 1 can be greatly increased. Furthermore, the step portion 7 is formed in the side portions of the liquid crystal display panel 12 and the adhesive layer 45 such that a part of the light source unit 50 is superimposed on the liquid crystal display panel 12, and thus, the light source unit 50 can be provided in the liquid crystal display device 1 without increasing the width of the non-display area 3.

In addition, the light source unit 50 is disposed such that the notch portion 77 formed in the light shielding member 71 of the light source unit 50 is superimposed on a part of the driver IC 27, and thus, the driver IC 27 and the light source unit 50 do not contact to each other while light leaking form the light guide plate 51 is shielded by the light shielding member 71. Therefore, the light source unit 50 can be disposed so as to be superimposed on the driver IC 27 to thereby reduce the thickness of the non-display area 3 without increasing the width of the non-display area 3.

Other Embodiments

In each of the first and third embodiments, a case where the panel laminated body 10 includes the liquid crystal display panel 12 and the back light unit 13 has been described. However, the panel laminated body 10 may include another panel, such as a parallax barrier panel and the like. In such a case, a side portion of the liquid crystal display panel 12, a side portion of the parallax barrier panel, and a side portion of the adhesive layer 45 form a step portion 7, and the light source unit 50 is disposed in the step portion 7, so that similar advantages to those of the first to third embodiments can be achieved.

In the third embodiment, a structure in which the light source unit 50 includes the double-faced tape 72 has been described but, in addition to that, a structure in which, similar to the second embodiment, the reflection layer 75 is printed on the second sub FPC 33 may be employed.

In each of the above-described embodiments, the liquid crystal display device 1 has been described. However, the technology according to the present disclosure may be applied to other display devices, such as an organic EL display device including, for example, an organic EL display panel as a display panel, and the like.

In each of the first to third embodiments, it has been described that a light shielding film is formed on the cover substrate 41 in the side end portion 40*a* of the substrate member 40 and the plurality of operation sections 4 which transmit light are formed in the light shielding film. Examples of the light shielding film herein include a film which substantially completely shields light emitted thereto and a film which shield a part of light emitted thereto and transmits other part of light.

The present disclosure is not limited to the first to third embodiments, but includes structures obtained by combining, as appropriate, the first to third embodiments.

INDUSTRIAL APPLICABILITY

As has been described above, the technology disclosed herein is useful for a flat display device, such as, for example, a liquid crystal display device.

DESCRIPTION OF REFERENCE CHARACTERS

1 Liquid crystal display device
2 Display area
3 Non-display area
4 Operation section
6 Void
7 Step portion 12 Liquid crystal display panel
13 Back light unit
27 Driver IC (circuit member)
33 Second sub FPC (flexible printed circuit board)
40 Substrate member
44 Touch panel
45 Adhesive layer
50 Light source unit
51 Light guide plate
71 Light shielding member
72 Double-faced tape
74 LED (light source)
75 Reflection layer
77 Notch portion

The invention claimed is:

1. A display device, comprising:
a display panel;
a display area in which display is performed by the display panel;
a non-display area formed in a circumference of the display area;
a substrate member attached to the display panel with an adhesive layer interposed therebetween and including an operation section formed in the non-display area;
a step portion formed by a side portion of the display panel and a side portion of the adhesive layer such that a void is generated in a part between the display panel and the operation section of the substrate member; and
a light source unit disposed in the void such that a part of the light source unit is superimposed on the display panel in the step portion and configured to supply illumination light to the operation section to light the operation section; wherein
the light source unit includes a light source, a light guide plate which light of the light source enters, a light shielding member which is provided in a circumference of the light guide plate and has a frame shape, and a flexible printed circuit board configured that controls the light source provided on an opposite side of the light guide plate to a side thereof which faces the substrate member.

2. The display device of claim 1, wherein
a reflection layer is printed on the flexible printed circuit board so as to reflect light emitted from the light guide plate to the flexible printed circuit board to the light guide plate.

3. The display device of claim 1, wherein
the display panel includes a circuit member provided on the step portion,
a notch portion is formed in the light shielding member of the light source unit, and
the light source unit is disposed such that the notch portion of the light shielding member is superimposed on a part of the circuit member.

4. The display device of claim 1, wherein
the display panel includes a circuit member provided on the step portion, and
the flexible printed circuit board has a smaller thickness in an area thereof facing the circuit member than in other area thereof.

5. The display device of claim 1, further comprising:
a back light unit provided separately and independently from the light source unit on an opposite side of the display panel to a side thereof which faces the substrate member and serving as a light device which supplies light to the display area.

6. The display device of claim 1, wherein:
the substrate member includes a touch panel, and
the operation section is used for an input operation on the touch panel.

7. The display device of claim 6, wherein the substrate member further includes a cover substrate.

8. The display device of claim 6, wherein the touch panel is formed in the display area and the operation section.

9. The display device of claim 7, wherein the touch panel is attached to the cover substrate with a resin film interposed therebetween.

10. The display device of claim 1, wherein the substrate member includes a side end portion that extends toward a same side as the step portion and protrudes beyond the display panel.

11. The display device of claim 10, wherein the adhesive layer is provided so that the side end portion is exposed.

12. The display device of claim 10, wherein the operation section is formed in the side end portion.

13. The display device of claim 10, wherein the light source unit is disposed on the side end portion.

* * * * *